United States Patent
Peir et al.

(10) Patent No.: US 6,725,341 B1
(45) Date of Patent: Apr. 20, 2004

(54) CACHE LINE PRE-LOAD AND PRE-OWN BASED ON CACHE COHERENCE SPECULATION

(75) Inventors: Jih-Kwon Peir, Gainsville, FL (US);
Steve Y. Zhang, Camas, WA (US);
Scott H. Robinson, Portland, OR (US);
Konrad Lai, Vancouver, WA (US);
Wen-Hann Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 09/605,239

(22) Filed: Jun. 28, 2000

(51) Int. Cl.$^7$ ................................................. G06F 12/00
(52) U.S. Cl. ..................... 711/141; 711/142; 711/143; 711/144; 711/130; 711/117; 711/118
(58) Field of Search .................................. 711/118, 121, 711/124, 141, 143–144, 137, 128, 205, 147

(56) References Cited

U.S. PATENT DOCUMENTS

| | | | |
|---|---|---|---|
| 4,410,944 A | * 10/1983 | Kronies | 700/5 |
| 4,747,043 A | * 5/1988 | Rodman | 711/124 |
| 5,119,485 A | * 6/1992 | Ledbetter et al. | 711/143 |
| 5,197,144 A | * 3/1993 | Edenfield et al. | 711/143 |
| 5,214,766 A | 5/1993 | Liu | 395/425 |
| 5,339,449 A | * 8/1994 | Karger et al. | 710/6 |
| 5,369,753 A | * 11/1994 | Tipley | 711/122 |
| 5,522,058 A | * 5/1996 | Iwasa et al. | 711/145 |
| 5,588,131 A | 12/1996 | Borrill | 395/473 |
| 5,604,882 A | * 2/1997 | Hoover et al. | 711/121 |
| 5,644,753 A | * 7/1997 | Ebrahim et al. | 711/131 |
| 5,749,095 A | 5/1998 | Hagersten | 711/141 |
| 5,802,559 A | * 9/1998 | Bailey | 365/189.03 |
| 5,987,571 A | * 11/1999 | Shibata et al. | 711/137 |
| 6,092,155 A | * 7/2000 | Olnowich | 711/142 |
| 6,314,496 B1 | * 11/2001 | Razdan et al. | 711/141 |

OTHER PUBLICATIONS

Dahlgren, Fredrik, "Techniques for Improving performance of hybrid snooping Cache Protocols", *J. of Parallel and Distributed Computing vol. 59, No. 3, XP000865433*, (Dec. 1999),329–359.

* cited by examiner

*Primary Examiner*—Matthew Kim
*Assistant Examiner*—Zhuo H. Li
(74) *Attorney, Agent, or Firm*—Schwegman, Lundberg, Woessner & Kluth, P.A.

(57) ABSTRACT

The invention provides a cache management system comprising in various embodiments pre-load and pre-own functionality to enhance cache efficiency in shared memory distributed cache multiprocessor computer systems. Some embodiments of the invention comprise an invalidation history table to record the line addresses of cache lines invalidated through dirty or clean invalidation, and which is used such that invalidated cache lines recorded in an invalidation history table are reloaded into cache by monitoring the bus for cache line addresses of cache lines recorded in the invalidation history table. In some further embodiments, a write-back bit associated with each L2 cache entry records when either a hit to the same line in another processor is detected or when the same line is invalidated in another processor's cache, and the system broadcasts write-backs from the selected local cache only when the line being written back has a write-back bit that has been set.

23 Claims, 2 Drawing Sheets

CACHE LINE PRE-LOAD AND PRE-OWN BASED ON CACHE COHERENCE SPECULATION

FIELD OF THE INVENTION

The invention relates generally to cache memory in computer systems, and more specifically to a cache management system providing pre-load and pre-own functionality to enhance cache efficiency in shared memory distributed cache multiprocessor computer systems.

BACKGROUND OF THE INVENTION

Multiprocessor computer systems are commonly used in high-performance applications because they can offer higher performance than systems using a single processor. Utilizing multiple processors that are not individually capable of providing the same performance as a multiprocessor computer system allows division of computing tasks among the multiple processors, decreasing the amount of work required in a single processor to complete a given task. Also, more than one task can be performed at a single time where each task or thread is executing on a separate processor or group of processors, enabling multiprocessor systems to efficiently serve multiple functions at a time. Multiprocessor systems incorporate many methods of allocating processor resources to the various tasks or threads they execute, all of which are designed to take advantage of the capability of such systems to perform computations on more than one processor at a time.

Early multiprocessor systems were typically large mainframe or supercomputers that were comprised of several processors mounted in the same physical unit. More recently, multiprocessor systems have evolved to include arrays or networks of interconnected computers or workstations that divide large tasks among themselves in a way that is similar to the division of tasks in traditional multiprocessor systems, and can achieve similarly impressive results. A variety of multiprocessor system architectures have evolved to include various combinations of these attributes, such as a network of interconnected multiprocessor workstations that divide tasks both among the processors in each workstation and among interconnected workstations.

With multiple processors working on a task in any configuration, a mechanism must exist for processors to share access to data and to share the results of their computations. One solution is use of a centralized shared memory which comprises a single memory that any processor can access. Other systems have distributed or independent memory for each processor or group of processors, providing faster access to the memory that is local to each processor or group of processors than is typically possible in a centralized memory architecture. In such systems, processors can access memory local to other processors or groups of processors, but doing so takes somewhat longer than accessing local memory.

The memory, whether centralized or distributed, can be further shared or multiple-address-type memory. Shared address memory is memory that can be accessed by any processor, whether the memory is distributed or centralized, to facilitate communication of data with other processors. Multiple address memory has separate memory for each processor or group of processors, and does not allow other processors or groups of processors to access this memory directly. Therefore, multiple address systems must rely on messages to share data between processors.

Cache memory can be used in any of these memory configurations to provide faster access to data that the processors are likely to need, and to reduce requests for the same commonly used data to be transmitted over the system bus. Storing data in cache provides faster access to the data, as cache memory is typically a more expensive but substantially faster memory type than is used for general system memory. The cache associated with each processor or group of processors in a distributed shared memory system likely maintains local copies of data that resides in memory local to other processors, and so also reduces the need to retrieve such data over the system bus.

Information about each block of memory is usually stored in a directory, which indicates which caches have copies of the memory block, whether the data is valid or invalid (dirty), and other such data. The directory is used to ensure cache coherency, or to ensure that the system can determine whether the data in each cache is valid. The directory also tracks which caches hold data that is to be written back to memory, and facilitates granting exclusive write access to one processor to update the memory. After the memory is updated, all other cached copies of the memory are no longer current and are marked invalid.

In this type of cache system, it is not uncommon for one processor to request exclusive access to or write to a specific cache line, invalidating all other copies of that line in other caches. In systems with large caches, most cache lines are invalidated for such reasons rather than replaced due to age, making invalidation of cache lines a critical factor in cache performance. What is needed is a method to reduce the impact of cache line invalidation due to granting of exclusive write access to another processor or modification of the line by another processor.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
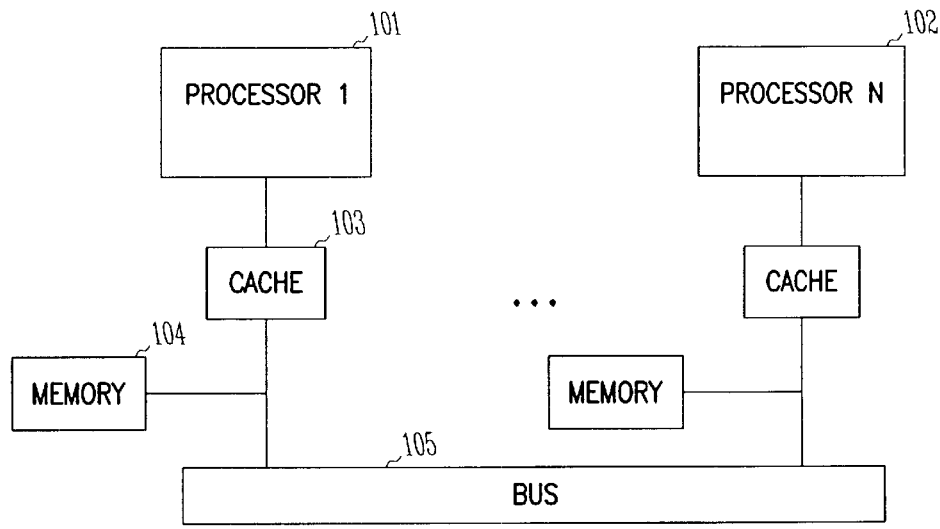
FIG. 1 shows a distributed shared memory multiprocessor computer system with multiple local caches, consistent with the prior art.
Figure 2:
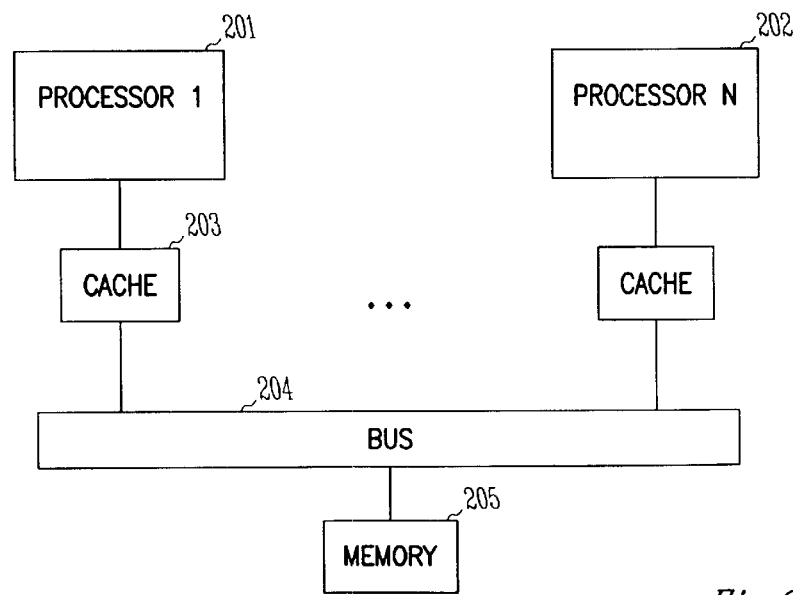
FIG. 2 shows a bus-based shared memory multiprocessor computer system with multiple local caches, consistent with the prior art.

The invention provides methods for reducing the impact of cache line invalidation on cache efficiency in distributed cache multiprocessor computer systems. FIGS. 1 and 2 show examples of multiprocessor systems with distributed cache, including the distributed shared memory configuration shown in FIG. 1 and the bus-based shared memory configuration shown in FIG. 2.

The distributed memory configuration of FIG. 1 includes a plurality of processors, including processor 1 at 101 through processor n at 102. Each processor has a local cache 103 that includes a cache controller, and a local memory 104. The processor and local cache are connected to other processors and their associated memories and caches via bus 105. In alternate embodiments, banks of processors may share a memory 104 and a cache 103, and multiple banks of processors are interconnected via the bus 105.

The bus-based shared memory configuration of FIG. 2 also includes a plurality of processors, including processor 1 at 201 through processor n at 202. Each processor has a local cache 203 that includes a cache controller, and is connected to other processors and their local caches via bus 204. Bus 204 also serves to connect each local processor and cache to a common shared memory 205.

Because the local caches in both configurations store local copies of data that may be invalidated either due to the cached data being changed by another processor without being updated in all local caches or due to another processor requesting exclusive write access to the data, the data stored in the local caches will not necessarily remain valid until it is needed by the associated local processor. The present invention provides methods that are in one embodiment implemented in hardware to reduce the impact of cache line invalidation on cache efficiency. The invention comprises in one embodiment recording locally at each cache the cache lines that are given up involuntarily due to invalidation, which are then considered prefetch candidates due to the increased likelihood these lines will be reused in the near future. The data is prefetched in one embodiment by snarfing, which comprises intercepting data transferred between two other devices on a bus. Such snarfing takes place when a remote cache transfers a line to the requesting device or when a modified line is written back to memory. The invention in some embodiments selectively broadcasts over the bus those lines that are written back from level one cache (L1 cache) to level two (L2) cache, so that the write-back line data may be snarfed by other caches with involuntarily invalidated copies of the same line.

In compensating for cache invalidation, the present invention in various embodiments attempts to predict the future cache misses due to invalidation of cache lines. Actions are taken to reduce the cache coherence misses, such as snarfing selected data off the bus and writing back selected data over the bus to facilitate selective snarfing of that data.

To facilitate prediction of cache misses due to cache invalidation to ensure cache coherence, an Invalidate History Table (IHT) is established in each cache to record each of two types of coherence invalidation activity. First, clean-invalidate invalidations are recorded for each line, where a clean-invalidate invalidation comprises involuntary invalidation of a line due to the line being required to relinquish either an exclusive or shared state. Clean-invalidate line invalidations therefore are invalidations that occur when an unmodified cache line must sacrifice exclusive or shared ownership involuntarily due to a write request from another processor. The second type of invalidations recorded are dirty-invalidate invalidations, in which the data in the cache lines has been modified before the cache lines are invalidated. This can happen when a modified cache line is requested by another processor.

In some embodiments of the invention such as those utilizing write-back caches, a cache miss results in snooping other caches for the requested data before retrieving the data from memory. Snooping comprises a broadcast request to other caches for the requested data to ensure currency of the data retrieved, and therefore results in a subsequent request for the data from memory only if a current copy of the data is not found in another cache. If a cache-cache transfer results from snooping activity, all caches read (snarf) the line address of the snooped data and use the data to update the line if it is still stored in the local cache but recorded in the IHT as being invalidated. In further embodiments, all caches that retrieve the broadcast line or snarf the line store the line in a shared state.

In general terms, the result is revalidation comprising updating of the data stored in invalid cache lines or creation of a new cache line entry for cache lines that are recorded in the IHT whenever valid line data for the particular line is broadcast on the bus. Such broadcasts can happen when a line is transferred from a line owner's cache to a requesting cache in response to a read miss (cache-cache transfer), or when a modified line is evicted from the owner's cache and written back to memory (modified write-back). In a cache-cache transfer, the data is snarfed in a cache only when the line is recorded in the cache's IHT as clean-invalidate invalidated. Dirty-invalidate invalidated lines are not snarfed in cache-cache transfers because it is considered likely that the requesting cache will be updated shortly, invalidating the snarfed line.

In some embodiments, when a line is snarfed or preloaded because it is recorded in the IHT, the IHT will not again record the line as involuntarily invalidated if it is not referenced before it is again invalidated. This allows the IHT to adapt to the need of other nodes to use the same data.

In some embodiments triggered by a modified write back, all caches snarfing the data receive the data in the shared state regardless of whether the snarfing is a result of a clean-invalidate or dirty-invalidate IHT entry. This is because migration of data that is modified and then written back happens in a somewhat unpredictable order among processors. A pre-own request is issued in some embodiments in response to reading a shared line in a cache with a dirty-invalidate record of the line in the IHT, anticipating that the line may soon be modified.

Preloaded lines that are snarfed as a result of IHT entries can in some embodiments of the invention be placed in either the L1 or L2 cache of a particular processor or group of processors. In still other embodiments, the preloaded lines are placed in a separate preload buffer until their first use, at which time they are promoted to L2 cache. The preloaded lines in various embodiments occupy various positions in cache, from least-recently used (LRU) to most-recently used (MRU) for purposes of age or least-recently used cache line replacement. In some embodiments, placing preloaded lines in the least-recently used data position or near the least-recently used position can remedy cache pollution problems by forcing the preloaded line out of cache if it is not soon used.

In selecting L1 write-back activity to broadcast over the bus for possible snarfing, the bandwidth of the bus must be considered. In many systems, indiscriminate broadcasting of all L1 cache write-back activity may flood the bus and hinder normal system activity. In various embodiments of the invention, two methods are utilized to limit the amount of bus traffic generated by L1 write-back broadcasts. First, in one embodiment, an L2 write-through bit is associated with each L2 cache line entry. An L1 write-back broadcast is issued only when the corresponding wrote-through bit is on. This write-through bit is set when the processor obtains ownership of the line by invalidating the line in other caches. This situation occurs when a read or write miss causes invalidation in other caches. Second, rather than broadcasting both the address and data of the written line, the data is sent only after a matching address is found in any other IHT.

In further embodiments, write-backs from L1 to L2 cache are not written back to memory over the system bus if the write-through bit of the written back line is not on. In another embodiment, the L1 to L2 write back is not written to system memory when the written back line is not present in another cache's IHT. Such rules that restrict memory write backs to lines likely to be needed in other caches serve to further limit the number of transfers over the system memory bus to alleviate risk of flooding the bus with L1 cache write-back activity.

Figure 3:
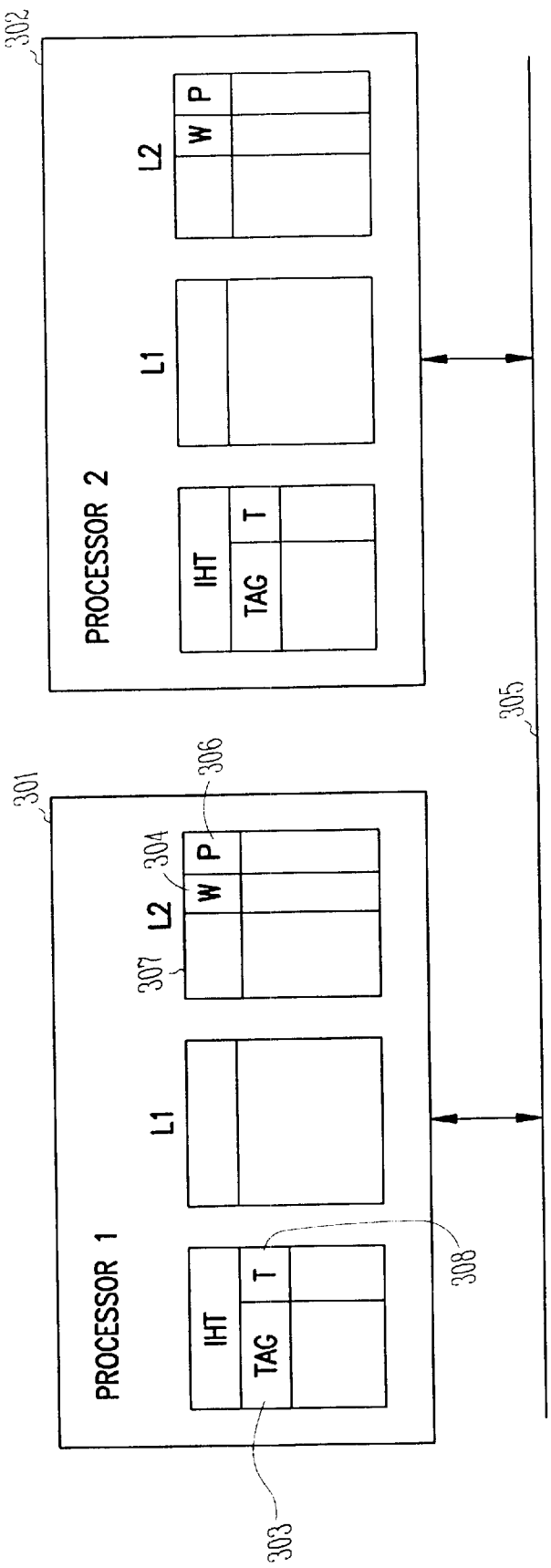
FIG. 3 shows an exemplary distributed shared memory system with multiple local L1 and L2 caches and implementing an Invalidate History Table (IHT), consistent with an embodiment of the present invention.

FIG. 3 illustrates one exemplary embodiment of the present invention, incorporating a distributed shared memory system with multiple local L1 and L2 caches. The embodiment implements an Invalidate History Table (IHT) 303 and a write-through bit associated with each L2 cache line shown at 304 in each processor node 301 and 302 to compensate for involuntarily relinquishment of cache lines due to cache coherence activity.

In this example embodiment, an invalidation type bit T shown at 308 is incorporated into each IHT such as 303 to indicate whether the corresponding IHT entry is a clean-invalidate or dirty-invalidate IHT entry. The write-through bit 'W' shown at 304 records L1 cache write-back candidates for broadcasting over the bus 305. In addition, a preload bit P shown at 306 is associated with each entry in the L2 cache 307, to identify cache lines that are preloaded due to early clean-invalidates.

When an L2 cache read miss is broadcast on the bus 305, all other processors will look up the line in their L2 caches. If a modified copy is found in any of the caches, the owner will transfer the line to the requestor as well as update the copy in main memory. If the line is also recorded as clean-invalidate in the IHT of the other processors, those processors will snarf the data during the cache-to-cache transfer. In such an instance, the line becomes shared. Also, a clean-invalidate line is removed from the IHT after the line is snarfed. The 'P' bit in the L2 cache as shown at 306 is set when the line is brought into the L2 cache due to an early clean-invalidate. The 'P' bit is reset once the line is first referred to by the processor. The line will not be recorded again in the IHT even upon another invalidate request as long as the 'P' bit remains on.

In the above situation when the modified line is not recorded as clean-invalidate in any other IHT, the original owner will invalidate the line and transfer ownership along with the data to the requester. In this case, the line will be recorded in the IHT of the original owner as dirty-invalidate. Meanwhile, the requestor will turn on the write-back bit 'W', indicating the corresponding line is a candidate for L1 write-back broadcasting.

When an L2 write miss is issued on the bus 305, all other processors will look up the line in their L2 caches. If a modified copy is found in any of the searched caches, the owner will transfer the line along with ownership of the line to the requester. The line is invalidated from the original owner's cache and recorded as dirty-invalidate in the IHT. The requester will again turn on the 'W' write-back bit, indicating the corresponding line is a candidate for L1 write-back broadcasting. Alternately, if a shared copy is found in one or more searched caches, all shared copies are invalidated and recorded in the respective IHTs as clean-invalidate. In this case, the requestor will also turn on the 'W' write-back bit associated with the requested line in L2 cache.

When an L1 write-back is received and the 'W' bit is on, an early broadcast of the line is triggered. All the processors will search their IHTs, and will snarf the line whenever the line is recorded in one or more IHTs, whether recorded as clean-invalidate or dirty-invalidate. In such an example, the line becomes shared. When an L1 read miss is received, a preown is triggered if the line is recorded in the IHT as dirty-invalidate and the L2 cache line state is shared, anticipating the line will be modified shortly after the read. Because broadcasting the L1 write-back is not time or coherence-critical, the broadcast can be buffered or simply discarded if the bus is very busy.

Replacement of a modified line from L2 cache similarly will always force a write-back and all other processors will receive the data on an IHT hit except for the cache from which the line was evicted.

Many embodiments of the invention other than those discussed above and in conjunction with the system of FIG. 3 are possible, and are within the scope of the invention. Use of an IHT and the preload and writeback bits associated with L2 cache lines facilitate reduction of the impact of cache line invalidation due to granting of exclusive write access to another processor or modification of a cache line by another processor, thereby improving cache efficiency. Use of alternate embodiments that perform the same function, such as using independent tables that record cached line addresses or other means of storing information comprising a part of the invention rather than the 'W' and 'P' bits as described in example embodiments, are within the scope of the invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A shared memory multiprocessor computer system, comprising:
    a plurality of processors;
    a bus linking the plurality of processors;
    a plurality of local caches;
    a cache invalidation history table associated with each local cache; and
    a cache controller associated with each local cache, each cache controller operable to track invalidated cache lines by recording the line addresses of invalidated cache lines and an indicator indicating whether each of the invalidated cache lines recorded was invalidated via a clean-invalidate or a dirty-invalidate in the invalidation history table, and further operable to revalidate only those invalidated cache lines recorded in the invalidation history table as having been clean-invalidate invalidated by monitoring the bus for cache line addresses of clean-invalidate invalidated cache lines recorded in the invalidation history table and for associated cache line data and by updating the invalidated cache line data with the cache line data associated with the recorded cache line addresses.

2. The shared memory multiprocessor computer system of claim 1, wherein the plurality of local caches are local to a single processor.

3. The shared memory multiprocessor computer system of claim 1, wherein the plurality of local caches are local to a node comprising the plurality of processors.

4. The shared memory multiprocessor computer system of claim 1, wherein the plurality of local caches are L2 caches.

5. The shared memory multiprocessor computer system of claim 1, wherein the plurality of local caches are write-back caches.

6. The shared memory multiprocessor system of claim 1, wherein when the valid cache line data is present on the bus due to a modified write-back.

7. The shared memory multiprocessor system of claim 1, wherein the cache controller further comprises a write-back bit associated with entries in the local cache that is set when either a hit to the same line in another processor is detected or when the same line is invalidated in another processor's cache, and wherein the system broadcasts write-backs from a selected local cache only when the line being written back has an associated write-back bit set.

8. The shared memory multiprocessor system of claim 7, wherein the selected local cache is an L1 cache.

9. The shared memory multiprocessor system of claim 7, wherein the write-back bit is set only when the processor local to the local cache has write or exclusive write access to the line.

10. A cache controller, the cache controller associated with a local cache, the cache controller operable to track invalidated cache lines by recording the line addresses of invalidated cache lines and an indicator indicating whether each of the invalidated cache lines recorded was invalidated via a clean-invalidate or a dirty-invalidate in an invalidation history table, and further operable to revalidate only those invalidated cache lines recorded in the invalidation history table as having been clean-invalidate invalidated by monitoring the bus for cache line addresses of clean-invalidate invalidated cache lines recorded in the invalidation history table and for associated cache line data and by updating the invalidated cache line data with the cache line data associated with the recorded cache line addresses.

11. The cache controller of claim 10, wherein the cache controller comprises an integrated circuit.

12. The cache controller of claim 10, wherein the cache controller comprises part of a processor.

13. The cache controller of claim 10, wherein when the valid cache line data is present on the bus due to a modified write-back.

14. The cache controller of claim 10, further comprising a write-back bit associated with entries in the local cache that is set when either a hit to the same line in another processor is detected or when the same line is invalidated in another processor's cache, and wherein the system broadcasts write-backs from a selected local cache only when the line being written back has an associated write-back bit set.

15. The cache controller of claim 14, wherein the selected local cache is an L1 cache.

16. The cache controller of claim 14, wherein the write-back bit is set only when the processor local to the local cache has write or exclusive write access to the line.

17. A method of controlling a cache, comprising:
tracking invalidated cache lines by recording the line addresses of invalidated cache lines and an indicator indicating whether each of the invalidated cache lines recorded was invalidated via a clean-invalidate or a dirty-invalidate in an invalidation history table; and
revalidating only those invalidated cache lines recorded in the invalidation history table as having been clean-invalidate invalidated by monitoring the bus for cache line addresses of clean-invalidate invalidated cache lines recorded in the invalidation history table and for associated cache line data and by updating the invalidated cache line data with the cache line data associated with the recorded cache line addresses.

18. The method of claim 17, wherein the method of controlling a cache is performed in an integrated circuit.

19. The method of claim 17, wherein the method of controlling a cache is performed in a processor.

20. The method of claim 17, wherein when the valid cache line data is present on the bus due to a modified write-back.

21. The method of claim 17, further comprising:
setting a write-back bit associated with an entry in the cache of a local processor when either a hit to the same line in another processor is detected or when the same line is invalidated in another processor's cache, and wherein the system broadcasts write-backs from a selected local cache only when the line being written back has an associated write-back bit set.

22. The method of claim 21, wherein the selected cache of a local processor is an L1 cache.

23. The method of claim 21, wherein the write-back bit is set only when the processor local to the cache has write or exclusive write access to the line.

* * * * *